May 28, 1940.  A. BERNHARD ET AL  2,202,441
PHOTOELECTRIC EXPOSURE METER WITH SEVERAL RANGES OF MEASUREMENT
Filed Nov. 17, 1937
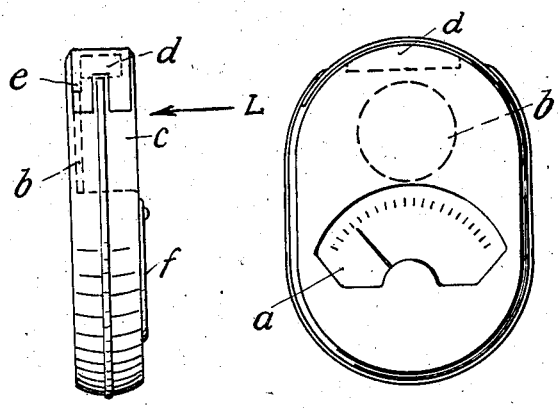
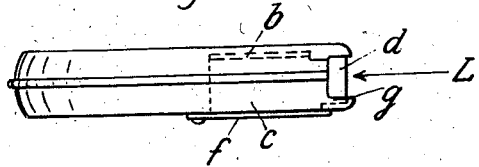
A. Bernhard, G. Beyrich, Inventors,
& M. Aron
By: Glascock Downing & Seebold
Attys.

Patented May 28, 1940

2,202,441

UNITED STATES PATENT OFFICE 2,202,441

PHOTOELECTRIC EXPOSURE METER WITH SEVERAL RANGES OF MEASUREMENT

Albrecht Bernhard and Guido Beyrich, Nuremberg, Germany, and Manfred Aron, Vienna, Austria, assignors to Metrawatt Aktiengesellschaft, Fabrik Elektrischer Messgeraete, Nuremberg, Germany, a German company Application November 17, 1937, Serial No. 175,162
In Germany November 2, 1934

5 Claims. (Cl. 88—23)

It is known to effect a change of the range of measurement in photoelectric exposure meters by placing a diaphragm in the path of the incident light which limits the amount of light falling on the photoelectric element in the desired proportions. When on the contrary this diaphragm is removed from the path of the incident light rays the element is completely exposed to the uninterrupted light rays. The exposure meter will be used with the diaphragm in either of these two positions according to the prevailing intensity of light.

The exposure meter is simplified according to this invention due to the fact that for the purpose of producing different ranges of measurement, the casing of the exposure meter is provided with two openings for the admission of the light, which are respectively allotted to the ranges of measurement and admit the incident light to the photoelectric element in proportions corresponding to the two ranges of measurement. The light to be measured is allowed to pass to the element either through one or the other opening according to the prevailing intensity of light.

A suitable construction is obtained by providing a comparatively flat casing and by arranging one opening for the admission of light in the front of the casing and the other opening in the wider side. One or both openings may be made so that they can be closed by a cover.

Other improvements will be gathered from the following description in which a construction according to the invention is explained with reference to the accompanying drawing in which:

Figures 1 and 2 show in respective side and front elevations a photoelectric exposure meter according to the invention employing one of the openings for the admission of light.

Figure 3 shows the same exposure meter in side elevation, with the other opening in operation.

In the casing of the exposure meter are mounted a direct current meter $a$ and a photoelectric element $b$ electrically connected to it. The casing comprises two openings for the admission of light, the opening $c$ in the wide side and the opening $d$ in the front.

In the case of low intensity of light, the instrument is used in the position shown in Figures 1 and 2, in which the light to be measured falls in the direction of the arrow L through the opening $c$ in full strength on the photoelectric element $b$. The opening $d$ may be closed for the measuring period by means of a cap $e$, but it could also be easily closed by a finger.

In the case of light of high intensity, the instrument is used in the position shown in Figure 3, in which the light to be measured enters in the direction of the arrow L through the opening $d$. The opening $c$ may be closed during this exposure by means of a cover $f$ rotatably mounted on the casing, which, in the position shown in Figures 1 and 2, was thrown back. The light rays admitted through the opening $d$ strike the photoelectric element not at a right angle, but obliquely, so that the latter, when the prevailing light is of high intensity will not be illuminated to the same extent as in Figures 1 and 2. As in this case it is mainly the rays of light which come obliquely from below, which influence the element, it is advisable to provide for reflection of the rays coming from the top by providing the lower side $g$ of the light opening $d$ with a reflecting, or at least diffusely reflecting surface. In the same way, the rays obliquely coming in from the top may be supplied to the element by providing the cover $f$ with a reflecting surface on the inside.

The invention is not limited to the construction described, more particularly, the openings for admission of light may be arranged and formed in a different way. It is only essential that the light should be supplied to the photoelectric element in different intensities through the two openings, and that the ratio of intensity should correspond to the desired ranges of measurement.

We claim:

1. In a photoelectric exposure meter, a casing, a substantially flat photoelectric element within the casing, a meter connected to the photoelectric element, said casing having openings therein of different areas, one of said openings being arranged with the axis thereof substantially parallel with respect to the flat photoelectric element, the other of said openings being arranged with the axis thereof substantially perpendicular to the photoelectric element, and the first mentioned opening being arranged intermediate the photoelectric element and the second mentioned opening.

2. In a photoelectric exposure meter, a casing, a substantially flat photoelectric element within the casing, a meter connected to the photoelectric element, said casing having an opening therein arranged with the axis thereof substantially parallel with respect to the flat photoelectric element, said casing having another opening therein arranged with the axis thereof substantially perpendicular to the flat photoelectric element, said first mentioned opening being arranged intermediate the photoelectric element and the second mentioned opening, and reflecting means for reflecting light entering the casing through the first mentioned opening onto the photoelectric element.

3. In a photoelectric exposure meter, a casing, a substantially flat photoelectric element within the casing, a meter within the casing connected to the photoelectric element, said casing having openings therein of different sizes, one of said openings being arranged with the axis thereof substantially parallel with respect to the flat photoelectric element, the other of said openings being arranged with the axis thereof substantially perpendicular to the photoelectric element, said first mentioned openings being intermediate the photoelectric element and the second mentioned opening, and a cover carried by the casing for closing one of the openings.

4. In a photoelectric exposure meter, a casing, a substantially flat photoelectric element within the casing, a meter connected to the photoelectric element, said casing having an opening therein arranged with the axis thereof substantially parallel with respect to the flat photoelectric element, said casing having another opening therein arranged with the axis thereof substantially perpendicular to the photoelectric element, said first mentioned opening being arranged intermediate the photoelectric element and the second mentioned opening, a cover pivoted to the casing for closing the second mentioned opening, and a reflector carried by the inner surface of said cover.

5. In a photoelectric exposure meter, a casing having an end wall and side walls, a substantially flat photoelectric element within the casing adjacent one side wall thereof, a meter connected to the photoelectric element, said casing having openings therein, one of said openings being arranged in the end wall of the casing with the axis thereof substantially parallel with respect to the flat photoelectric element, the other of said openings being arranged with the axis thereof substantially perpendicular to the photoelectric element and in the other side wall of the casing, and one of said openings being larger than the other opening.

ALBRECHT BERNHARD.
GUIDO BEYRICH.
MANFRED ARON.